US007385128B2

(12) United States Patent
Lawliss et al.

(10) Patent No.: US 7,385,128 B2
(45) Date of Patent: Jun. 10, 2008

(54) METRONOME WITH PROJECTED BEAT IMAGE

(75) Inventors: Robert W. Lawliss, Amesbury, MA (US); David A. Bornstein, North Reading, MA (US)

(73) Assignee: Tailgaitor, Inc., Amesbury, MA (US)

( * ) Notice: Subject to any disclaimer, the term of this patent is extended or adjusted under 35 U.S.C. 154(b) by 198 days.

(21) Appl. No.: 11/207,067

(22) Filed: Aug. 18, 2005

(65) Prior Publication Data

US 2006/0117937 A1 Jun. 8, 2006

Related U.S. Application Data

(60) Provisional application No. 60/633,466, filed on Dec. 6, 2004.

(51) Int. Cl.
*G09B 15/00* (2006.01)

(52) U.S. Cl. ...................................... 84/484; 84/477 R

(58) Field of Classification Search .............. 84/477 R, 84/484, 477 B; 362/327; 368/82-84, 223, 368/226, 239-242; 372/9, 24

See application file for complete search history.

(56) References Cited

U.S. PATENT DOCUMENTS 3,876,309 A * 4/1975 Zicaro et al. ............... 356/153
3,901,121 A 8/1975 Kleiner
4,001,840 A * 1/1977 Becker et al. .............. 347/259
4,014,167 A 3/1977 Hasegawa et al.
4,070,944 A 1/1978 del Castillo
4,090,355 A 5/1978 Morohoshi
4,141,273 A * 2/1979 Austin ......................... 84/484
4,193,257 A 3/1980 Watkins
4,214,874 A 7/1980 White
4,218,874 A 8/1980 Ishida et al.
4,333,172 A 6/1982 Chen
4,366,741 A 1/1983 Titus
4,462,297 A 7/1984 Dill et al.
4,583,443 A 4/1986 Senghaas et al.
4,649,794 A 3/1987 George
4,753,148 A * 6/1988 Johnson .................... 84/464 R
5,275,082 A 1/1994 Kestner-Clifton et al.
5,402,188 A 3/1995 Wayne
5,421,236 A 6/1995 Sanger (Continued)

FOREIGN PATENT DOCUMENTS

CA 2227286 7/1999

(Continued)

*Primary Examiner*—Lincoln Donovan
*Assistant Examiner*—David S. Warren
(74) *Attorney, Agent, or Firm*—William A. Loginov; Loginov & Associates, PLLC

(57) ABSTRACT

A laser or other substantially collimated light source is operatively connected to a reciprocating driver that causes a beam from the laser to sweep across a conveniently viewable surface at an adjustable frequency, thereby tracing a pattern on the surface between a plurality of beam path boundaries. The beam's direction change at a beam path boundary generally serves as a visual indication of a musical beat. The laser may be positioned and/or aimed to project the beam on any surface. The frequency of driver reciprocation (i.e., the tempo) may be adjusted to correspond to one of a range of typical musical tempos, thereby providing the functionality of a metronome but with the novel and useful additional element of a projected beat image.

20 Claims, 11 Drawing Sheets

U.S. PATENT DOCUMENTS

| | | | | |
|---|---|---|---|---|
| 5,751,825 | A | 5/1998 | Myers et al. | |
| 5,850,048 | A | 12/1998 | Ruf | |
| 6,201,769 | B1 | 3/2001 | Lewis | |
| 6,592,245 | B1 * | 7/2003 | Tribelsky et al. | 362/551 |
| 6,651,365 | B1 * | 11/2003 | Wainwright | 40/452 |
| 6,653,543 | B2 | 11/2003 | Kulas | |
| 2003/0169377 | A1 | 9/2003 | Kulas | |
| 2007/0183466 | A1 * | 8/2007 | Son et al. | 372/24 |
| 2007/0224583 | A1 * | 9/2007 | Humphrey | 434/252 |
| 2008/0037374 | A1 * | 2/2008 | Chu et al. | 368/82 |
| 2008/0047413 | A1 * | 2/2008 | Laycock et al. | 84/477 R |
| 2008/0049797 | A1 * | 2/2008 | Morisawa et al. | 372/24 |

FOREIGN PATENT DOCUMENTS

| | | | | | |
|---|---|---|---|---|---|
| DE | 41 00 956 | A1 | | 7/1992 | |
| GB | 934999 | | | 8/1963 | |
| GB | 1218571 | | | 1/1971 | |
| GB | 2 275 352 | A | | 8/1994 | |
| JP | 355085277 | A | * | 6/1980 | 368/238 |
| JP | 362220892 | A | * | 9/1987 | |
| JP | 08167990 | A | | 6/1996 | |
| WO | WO 83/02508 | | | 7/1983 | |
| WO | WO 01/02913 | A1 | | 1/2001 | |
| WO | WO 03/052528 | A1 | | 6/2003 | |

* cited by examiner

METRONOME WITH PROJECTED BEAT IMAGE

CROSS-REFERENCE TO RELATED APPLICATION

The present application claims the benefit of U.S. Provisional Patent Application Ser. No. 60/633,466, which was filed on Dec. 6, 2004, by Robert Lawliss et al. for a METRONOME WITH PROJECTED BEAT IMAGE and is hereby incorporated by reference.

BACKGROUND OF THE INVENTION

1. Field of the Invention

The present invention relates to devices for indicating tempo or rhythm and, in particular, to metronomes using light.

2. Background Information

A metronome is a device that indicates a tempo or a rhythm. Musicians use metronomes when they practice or perform in order to keep a consistent tempo and/or to synchronize multiple musicians playing multiple musical instruments. A metronome may be adjusted to indicate any one of a range of tempos commonly used in musical compositions.

Musicians have used traditional pendulum metronomes for centuries. A pendulum metronome is a mechanical device using a weight on a rod to control the tempo. The rod swings back and forth with a consistent tempo, and a mechanical structure inside the metronome produces a clicking sound on each swing of the rod. To adjust the tempo, a user adjusts the physical placement of the weight on the rod. Traditional pendulum metronomes work well only for those musicians within direct view or audible range of the metronome. Furthermore, the clicking sound may be undesirable for live performances or recordings.

Current electronic metronomes provide a similar function to traditional pendulum metronomes, typically in a portable unit. These metronomes may include a dial or buttons for controlling the tempo, with one or more flashing lights and/or a speaker producing an auditory queue, such as a clicking sound, to indicate each beat. The flashing lights and/or the speaker share the primary disadvantages of the rod and the clicking sound of traditional pendulum metronomes; namely, these indicators work well only for those musicians within direct view of the metronome, and the auditory queue may be undesirable for live performances or recordings. Furthermore, a flash of light and/or a single auditory queue gives no information to the musician as to how time is progressing between beats. Also, the light may be out of view of a vast number of the musicians in a large ensemble.

To address some of the disadvantages posed by flashing lights and/or a speaker producing an auditory queue, current electronic metronomes may also include an output for connecting a set of headphones, to send the auditory queue directly to the musician's ears without broadcasting an undesirable sound during live performances or recordings. Multiple sets of headphones may be connected to the metronome to send the auditory queue to multiple musicians, thereby synchronizing the musicians without requiring a direct view of the metronome. Although sending the auditory queue via headphones may overcome some of the disadvantages of prior metronome designs, this solution requires additional equipment, such as additional wiring, additional connections, and a set of headphones for each musician. All of this additional equipment adds complexity, expense, potential distraction, and new potential points of failure to prior systems. Furthermore, an auditory queue via headphones still gives no information to the musician as to how time is progressing between beats.

SUMMARY OF THE INVENTION

The present invention overcomes the disadvantages of the prior art by providing a system and method for projecting a visual queue to a conveniently viewable surface so as to indicate a tempo or a rhythm such that one or more musicians may be synchronized without requiring auditory interference, headphones, multiple devices, and/or a direct line of sight to the device. The present invention also provides a continuous visual indication of the progress of the tempo such that a musician may anticipate a beat.

Illustratively, a laser or other substantially collimated light source is operatively connected to a reciprocating driver that causes a beam from the laser to sweep back and forth across the conveniently viewable surface at an adjustable frequency, thereby tracing a path across the surface between two beam path boundaries. The beam's direction change at a beam path boundary generally serves as a visual indication of a new musical beat. The laser may be positioned and/or aimed to project the beam on any surface, including, e.g., a far surface such as a wall of a music studio or a near surface such as a sheet of music in front of a musician. The frequency of driver reciprocation (i.e., the tempo) may be adjusted to correspond to one of a range of typical musical tempos, thereby providing the functionality of a metronome but with the novel and useful additional element of a projected beat image and without the disadvantages of the prior art. Thus, a "laser metronome" is herein described.

In an illustrative embodiment, the laser metronome includes a laser or other light source mounted on a reciprocating driver that may comprise a servo or other motorized transport. The servo and the laser are interconnected to a microcontroller that includes a Central Processing Unit (CPU), a Random Access Memory (RAM), a non-volatile memory, a Universal Synchronous Asynchronous Receiver-Transmitter (USART), a plurality of timers, and a plurality of Input/Output (I/O) Pins. The microcontroller interfaces with a display, a Musical Instrument Digital Interface (MIDI interface), a plurality of control buttons, and a foot switch input. The laser metronome may include a different configuration of components according to alternate embodiments.

According to alternate embodiments, the laser metronome may have additional functionality or features, such as a computer data connection, a digital display, a programmable tempo memory, a downbeat queue, additional visual queues, more complex beam paths, an auditory queue, a tap sensor, and/or features to enhance the laser metronome's portability. It will be apparent that other variations and modifications may be made to the described embodiments, with the attainment of some or all of their advantages.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
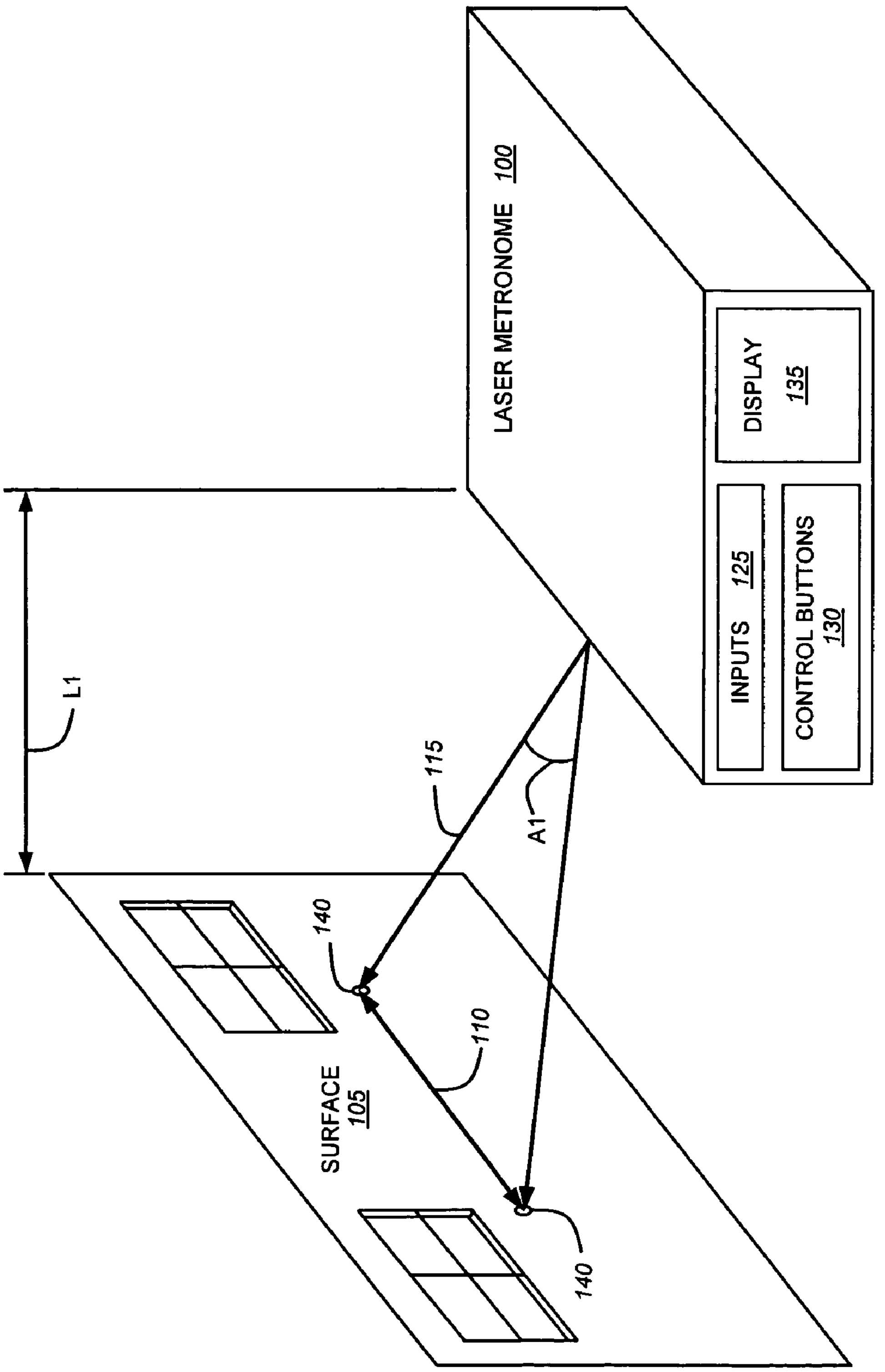
FIG. 1 is a diagram of a laser metronome projecting a beat image on a distant surface in accordance with an embodiment of the present invention.

The present invention is directed to a system and method for projecting a visual queue to a conveniently viewable surface so as to indicate a tempo or a rhythm such that one or more musicians may be synchronized without requiring auditory interference, headphones, multiple devices, and/or a direct line of sight to the device. The present invention also provides a continuous visual indication of the progress of the tempo such that a musician may anticipate a beat.

Illustratively, a laser or other substantially collimated light source is operatively connected to a reciprocating driver that causes a beam from the laser to sweep back and forth across the conveniently viewable surface at an adjustable frequency, thereby tracing a path across the surface between two beam path boundaries. The beam's direction change at a beam path boundary generally serves as a visual indication of a new musical beat. The laser may be positioned and/or aimed to project the beam on any surface, including, e.g., a far surface such as a wall of a music studio or a near surface such as a sheet of music in front of a musician. The frequency of driver reciprocation (i.e., the tempo) may be adjusted to correspond to one of a range of typical musical tempos (e.g., a predetermined range between 60 and 230 beats per minute, inclusive), thereby providing the functionality of a metronome but with the novel and useful additional element of a projected beat image and without the disadvantages of the prior art. Thus, a "laser metronome" is herein described.

In an illustrative embodiment, the laser metronome 100 includes a laser 200 or other light source mounted on a reciprocating driver that may comprise a servo 205 or other motorized transport. The servo 205 and the laser 200 are interconnected to a microcontroller 300 that includes a Central Processing Unit (CPU) 305, a Random Access Memory (RAM) 500, a non-volatile memory 400, a Universal Synchronous Asynchronous Receiver-Transmitter (USART) 330, a plurality of timers 310, 315, 320, and a plurality of Input/Output (I/O) Pins 325. The microcontroller 300 interfaces with a display 135, a Musical Instrument Digital Interface (MIDI interface) 220, a plurality of control buttons 130, and a foot switch input 215. The laser metronome 100 may include a different configuration of components according to alternate embodiments.

FIG. 1 is a diagram of a laser metronome 100 projecting a visual queue on a distant surface 105 to indicate a tempo in accordance with an illustrative embodiment of the present invention. Illustratively, the laser metronome 100 is encased in a plastic box appropriately sized to be portable and practical for use by a musician at home, in a music studio, and/or on a stage during a performance. The exemplary laser metronome 100 includes one or more inputs 125, one or more control buttons 130, and a display 135. The laser metronome 100 may also include a battery compartment, a power adapter such as an AC adapter, mounting hardware, and/or other external components according to alternate embodiments. The inputs 125 include a foot switch connector, a Musical Instrument Digital Interface (MIDI) connector, and other connectors according to alternate embodiments. "Inputs" 125, as described herein, refer to any means for sending information or data to the laser metronome 100, including, for example, a microphone connector, a tap sensor, a Universal Serial Bus (USB) connector, or equivalents.

According to the illustrative embodiment, the control buttons 130 include a Next Function button, a Mode Function button, and other buttons according to alternate embodiments. "Control buttons" 130, as described herein, refer to any means for control, including, for example, a switch, a rotary dial, a sliding indicator, a touchscreen, a keypad, and/or other means for sending commands to the laser metronome 100. Illustratively, the display 135 includes three 7-segment Light-Emitting Diode (LED) units, altogether capable of displaying up to a three-digit number for indicating the metronome's current tempo setting. According to alternate embodiments, the display 135 may include one or more lights for indicating metronome status or other information, e.g., an LED indicating power, a blinking LED indicating each beat, and/or a series of blinking LEDs indicating a downbeat or other aspects of the music. Alternately, the display 135 may include a screen, such as a liquid crystal display (LCD), for displaying the tempo, configuration settings, active connections, and/or other information. "Display" 135, as described herein, generally refers to any means for conveying information to users of the laser metronome 100.

As illustrated in FIG. 1, the laser metronome 100 may be positioned at a distance L1 from a surface 105, such as a wall. The laser metronome 100 projects a visual queue to the surface 105 to indicate a tempo. By the term "projecting", it is meant any action causing any image, light, illuminated area, and/or visual queue to be visible on a surface. A "visual queue", as described herein, may be any form of substantially collimated light projected onto a surface, for example a laser beam. The term "laser beam" 115, as used herein, refers to the output of a "laser", defined below in reference to FIG. 2. Illustratively, the beam 115 sweeps back and forth across the surface 105 at an adjustable frequency, thereby moving in a predetermined pattern (i.e., tracing a path 110)

on the surface 105 between beam path boundaries 140. Motion of the visual queue (e.g., the laser beam 115) corresponds to the progress of a tempo, and the beam 115 changing direction at a beam path boundary 140 serves as a visual indication of a new musical beat. Illustratively, the beam 115 reaches an angular limit, relative to an overall virtual or actual pivot point about which the beam 115 reciprocally rotates, at each beam path boundary 140, and the difference between the angular limits defines a sweep angle A1. The beam 115 continuously traverses the sweep angle A1 between each beat. Thus, the laser metronome 100 provides a continuous visual indication of the progress of a tempo such that multiple musicians facing the wall may be synchronized and may anticipate each beat. By "tempo", as used herein, it is meant a characteristic rate, rhythm, or pace, the frequency of a repeating event, and/or a descriptive or metronomic direction to one or more performers. "Progress of a tempo" refers to the passage of time between beats, repeating events, and/or directions. Note that a tempo may be constant, as in a typical musical composition, or it may vary, as in an accelerating series of repeating events.

According to an alternate embodiment, the path 110 may be nonlinear and may include more than two beam path boundaries 140. For example, the beam 115 may sweep between three beam path boundaries 140 to trace an L-shaped pattern wherein each downbeat is visually emphasized by a variation in the path 110. Likewise, other variations in path 110 may emphasize other aspects of the music or act as visual queues to the musicians. For example, a musician may use a foot switch to trigger a pre-programmed beam pattern during an improvisational live performance to indicate to other musicians an impending musical transition. Moreover, the predetermined pattern (i.e., the path 110) may be any pattern which serves to indicate tempo and/or changes in tempo, e.g., a line, a circle, an L-shape, or any combination thereof.

Figure 1A:
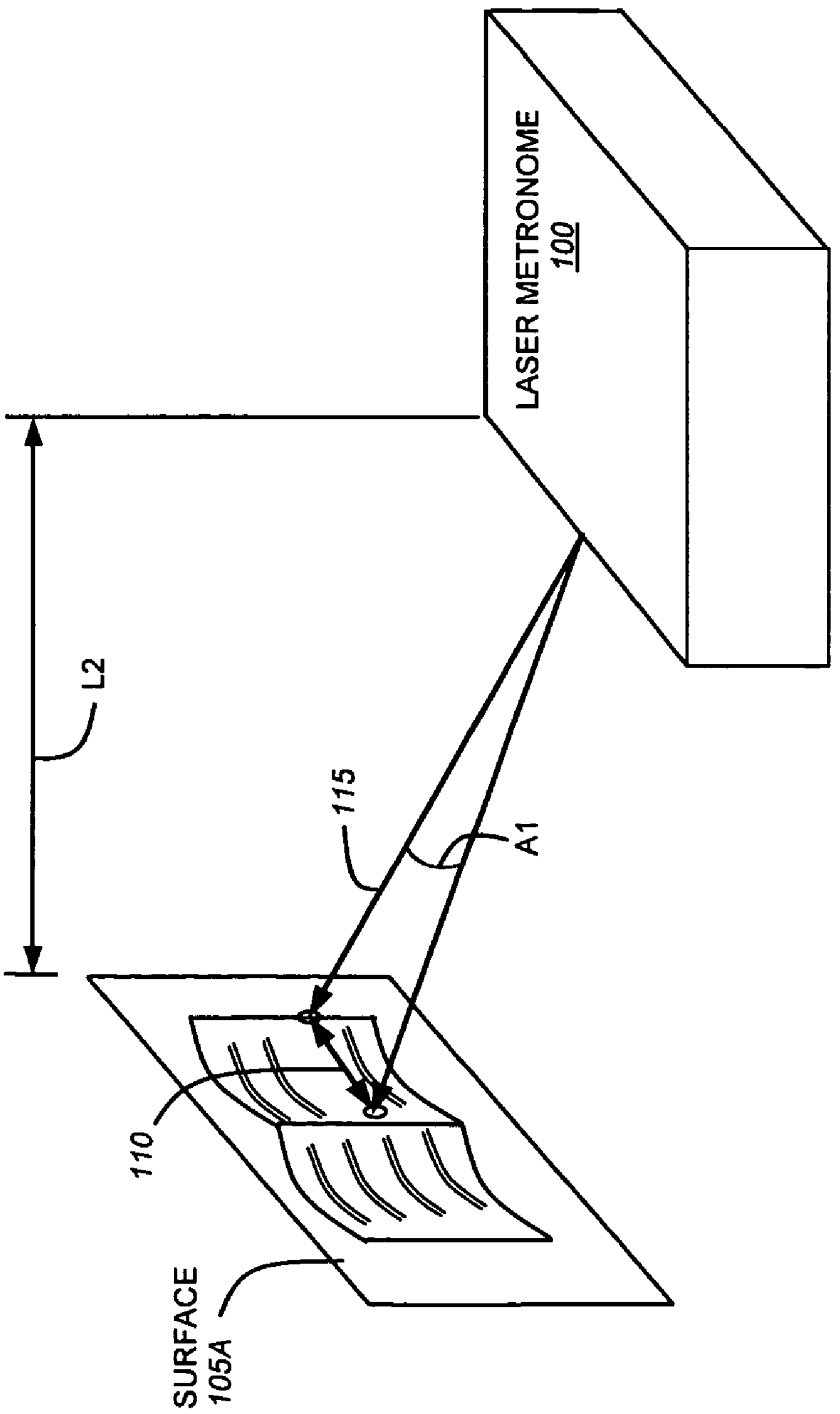
FIG. 1A is a diagram of the laser metronome of FIG. 1 projecting a beat image on a near surface in accordance with an embodiment of the present invention.

The distance and surface may be varied, as illustrated in FIG. 1A. Illustratively, the surface 105A is a sheet of music located relatively close to a musician, and the distance L2 is less than the distance L1. Given a linear path 110 with two beam path boundaries 140, as in the above illustrative embodiment, the sweep angle A1 remains unchanged, and the functionality of the laser metronome 100 is the same as in FIG. 1, except that FIG. 1A illustrates a single musician using the invention, rather than multiple musicians. Note that although the sweep angle A1 remains constant in the illustrative examples, the sweep angle A1 may, according to alternate embodiments, be adjustable and/or variable in response to inputs, commands, settings, and/or other information. For example, a musician may optionally increase the sweep angle A1 for near surfaces to thereby lengthen the path 110 and decrease the sweep angle A1 for far surfaces to thereby shorten the path 110.

Thus, the laser metronome 100 may be used on a variety of surfaces at infinitely variable distances while still achieving the purpose of the invention. A "surface", as described herein, may refer to any number of objects, substrates, targets, and/or reflective media to which the laser beam 115 is directed. External mounting hardware and/or other features of the laser metronome 100 may be adapted to the wide variety of possible surfaces and distances. For example, the laser metronome 100 may include a ring clip for mounting the metronome to a microphone stand, or a threaded socket for attaching a tri-pod or a microphone stand to the metronome. The laser metronome 100 may also include an attached and/or detachable screen, such as a folding sheet or a roll of paper, which may be used as a surface. For convenience, the laser metronome 100 may also be divided into multiple components, such as a beam emitter component and a separate control/input component, to provide greater flexibility in mounting the beam emitter while preserving convenient access to metronome controls. Such variations and modifications to the illustrative embodiments as would be apparent, particularly surface and distance variations, remain within the scope of the invention.

Figure 2:
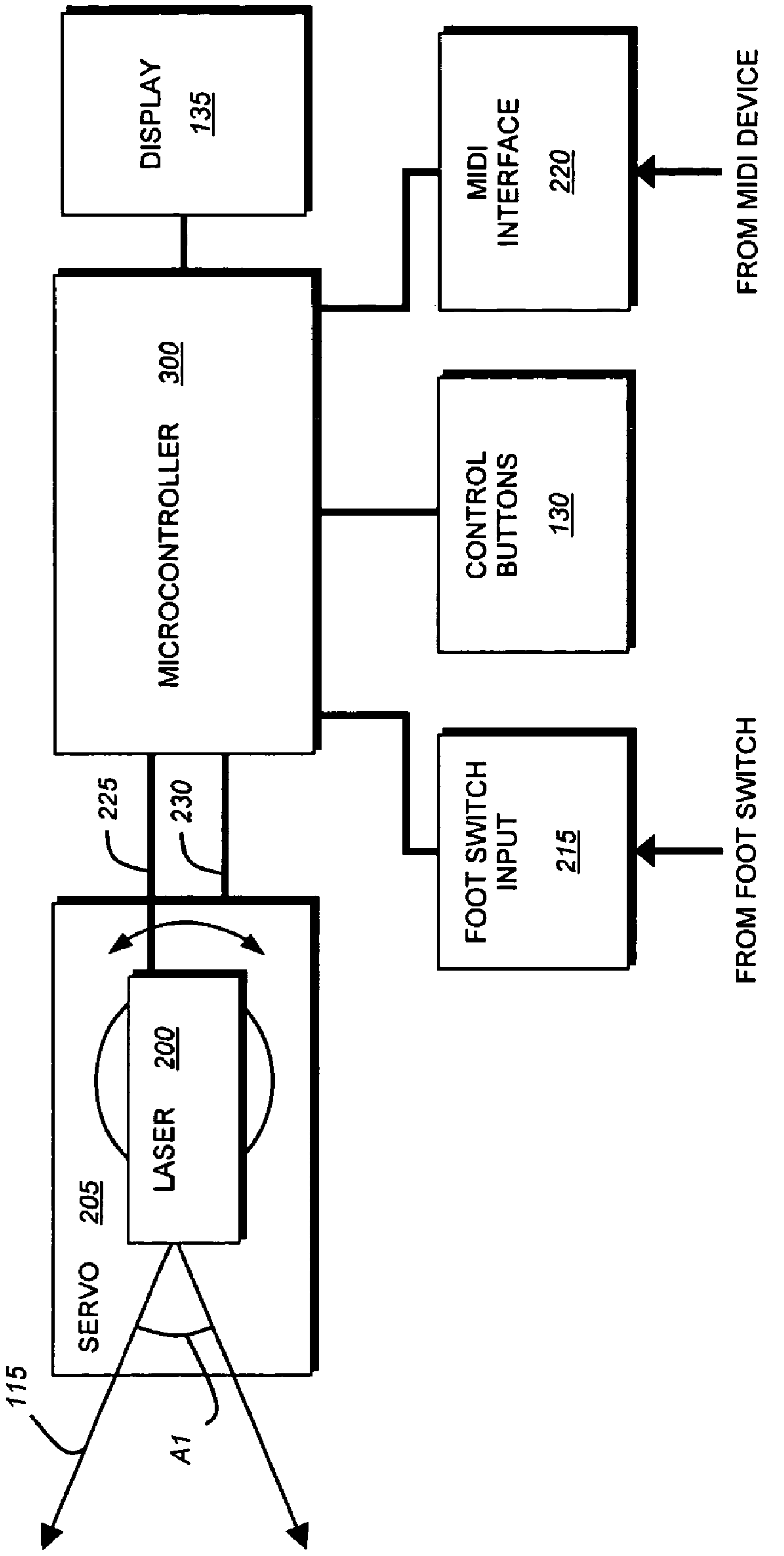
FIG. 2 is a schematic block diagram of the laser metronome of FIG. 1 in accordance with an embodiment of the present invention.

FIG. 2 is a schematic block diagram of components of a laser metronome 100 in accordance with an embodiment of the present invention. Illustratively, a laser 200 is mounted to a reciprocating driver, such as a servo 205, wherein the laser 200 and the driver are operatively connected to a microcontroller 300. The microcontroller 300 is operatively connected to the display 135, a foot switch input 215, the control buttons 130, and a MIDI interface 220. The components are mounted on a printed circuit board (PCB), itself mounted in the laser metronome 100 enclosure (e.g., a plastic box). Illustratively, the laser 200 and the reciprocating driver are mounted such that the laser beam 115 exits the enclosure through a slot in a wall of the enclosure, and the slot is wide enough to accommodate the sweep angle A1 of the beam 115 such that the wall of the enclosure does not obstruct the beam 115 at its angular limits. As used herein, the term "laser" refers to any light source capable of projecting substantially collimated light rays, for example one or more laser pointers, a lamp focused by a lens, or a light-emitting diode (LED) focused by an aperture. The laser 200, reciprocating driver, and/or enclosure may employ an alternate design, such as mounting the reciprocating driver to an enclosure externally, rather than to the laser 200, to achieve the same effect.

According to the illustrative embodiment, the reciprocating driver is a servo 205, such as a radio-control (RC) hobby servo. However, by "driver", as used herein, it is meant a mechanical and/or electromechanical element that causes the laser 200 and/or corresponding laser beam 115 to move in a predetermined or reciprocating pattern, as described above, and that can be a servo 205 (as in the illustrative embodiment), a stepper motor that performs a reversing function, or another electromechanical device, for example a unidirectional motor (regulated in the manner of a stepper motor or unregulated in the manner of a DC or AC motor) operatively connected to a clevis holding the laser 200 by a tie-bar such that the rotation of the motor causes the clevis to move in a reciprocating manner similar to the structure of a locomotive drive wheel. Conversely, it is contemplated that the "driver" can be a solid state mechanism that redirects the laser beam (or a plurality of beams or light rays) into different locations across the beam path to generate an image that has the appearance of motion. For example, the "driver" may be one or more variably refractive filaments or crystals which refract the laser beam in different directions in response to an electric field, a magnetic field, an electrical potential, and/or a signal from the microcontroller 300.

Illustratively, the microcontroller 300 controls the servo 205 and the laser 200 via channels 225, 230. In this example, the servo 205 is a conventional RC hobby servo controlled by sending a series of pulses (i.e., a pulse train) to the servo 205 at a rate of 100 pulses per second (100 Hz or one pulse per 10 ms). The position of the servo 205 is controlled by the width of the pulses in the pulse train, various pulse widths corresponding to various servo positions. In the case of exemplary servo 205, the pulse widths may be between one and two milliseconds (1 ms to 2 ms) wide. For example: a pulse train with pulse widths of 1.5 ms per pulse may correspond to a center position of the servo 205; a pulse train with pulse widths of 2 ms per pulse may correspond to a 90 degree turn of the servo 205 relative to the center position; and a pulse train with pulse widths of 1 ms per pulse may correspond to a −90 (negative 90) degree turn of the servo 205 relative to the center position. The relationship between pulse width and servo position may vary depending on the type of hobby servo 205. Likewise, the microcontroller signal for controlling servo position may vary depending on the type of servo 205. For example, typical hobby servos may be controlled by a pulse train with any rate between 50 Hz and 100 Hz. Other servos, including some hobby servos, may be controlled by pulse trains with other rates. As such, a 100 Hz pulse train controlling hobby servo position by pulse width should be taken as exemplary only.

In the illustrative embodiment, wherein the servo 205 is a hobby servo controlled by a 100 Hz pulse train and the beam path 110 is linear with two beam path boundaries 140, the motion of the servo 205 and the corresponding beam 115 is divided into 24 steps during each beat. Thus, in response to changes in the pulse widths of pulses in the pulse train, the servo 205 assumes 24 evenly spaced intermediate positions while causing the laser beam 115 to traverse the sweep angle A1. Likewise, the corresponding beam 115 assumes 24 evenly spaced intermediate positions as it sweeps between the beam path boundaries 140. Thus, according to the illustrative embodiment, the motion of the beam 115 is not perfectly continuous; however, in alternate embodiments, it may be. The illustrative embodiment uses 24 steps as exemplary only, because this is the number of hexa-decimal "F8" characters used to indicate a single beat under the Musical Instrument Digital Interface (MIDI) protocol. Alternately, the servo 205 or reciprocating driver may assume more or less intermediate positions. For example, the pulse widths of pulses in the pulse train may be increased or decreased between each pulse, yielding 100 steps per second when the servo 205 is controlled by a 100 Hz pulse train (depending on the tempo, this may be more or less than 24 steps per beat). It is expressly contemplated that, according to some embodiments, it may be undesirable to step the servo 205 on every pulse, due to vibration and/or settling effects resulting from the incremental stepping motion of the servo 205. Thus, it may be desirable to provide at least two pulses between each step (e.g., by stepping the servo 205 at a rate of 50 steps per second, where the servo 205 is controlled by a 100 Hz pulse train). Alternately, the reciprocating driver may be a mechanical or electromechanical device controlled by an analog regulator, such as an AC motor, thereby yielding continuous beam motion without intermediate steps. Moreover, depending on the embodiment, the number of intermediate steps between beats may be varied while still remaining within the scope of this invention.

Illustratively, a foot switch input 215 is one of the inputs 125 and is operatively connected to the microcontroller 300. A foot switch is a device commonly used by musicians to control equipment while the musician plays a musical instrument. A foot switch may be a simple device functioning as a single pole, single throw switch, or a more complex device with multiple configurable functions. The foot switch input 215 may receive signals from a foot switch to control the microcontroller 300. For example, the microcontroller 300 may be programmed to increment the tempo by 1 beat-per-minute (bpm) in response to a signal from the foot switch input 215. Other functions of the laser metronome 100 may also be controlled by the foot switch input 215.

A Musical Instrument Digital Interface (MIDI interface) 220 is also one of the inputs 125 and is operatively connected to the microcontroller 300, according to the illustrative embodiment. MIDI is an industry standard protocol which allows electronic musical instruments, computers, and other electronic music-related devices to communicate. Illustratively, the MIDI interface 220 is a 5-pin DIN (Deutsches Institut fur Normung; the German Institute for Standardization) connector operatively connecting an external MIDI device to the laser metronome 100. An external MIDI device, as described herein, is any device capable of communicating via the MIDI protocol, for example a computer, an electronic musical instrument, and/or another electronic music-related device. The microcontroller 300 may respond to MIDI messages received at the MIDI interface 220 to control and configure laser metronome 100 functionality, for example to set the tempo as described below in reference to FIG. 7. According to alternate embodiments, the laser metronome 100 may include one or more additional MIDI interfaces for passing MIDI messages "through" the laser metronome 100 to other devices.

Figure 3:
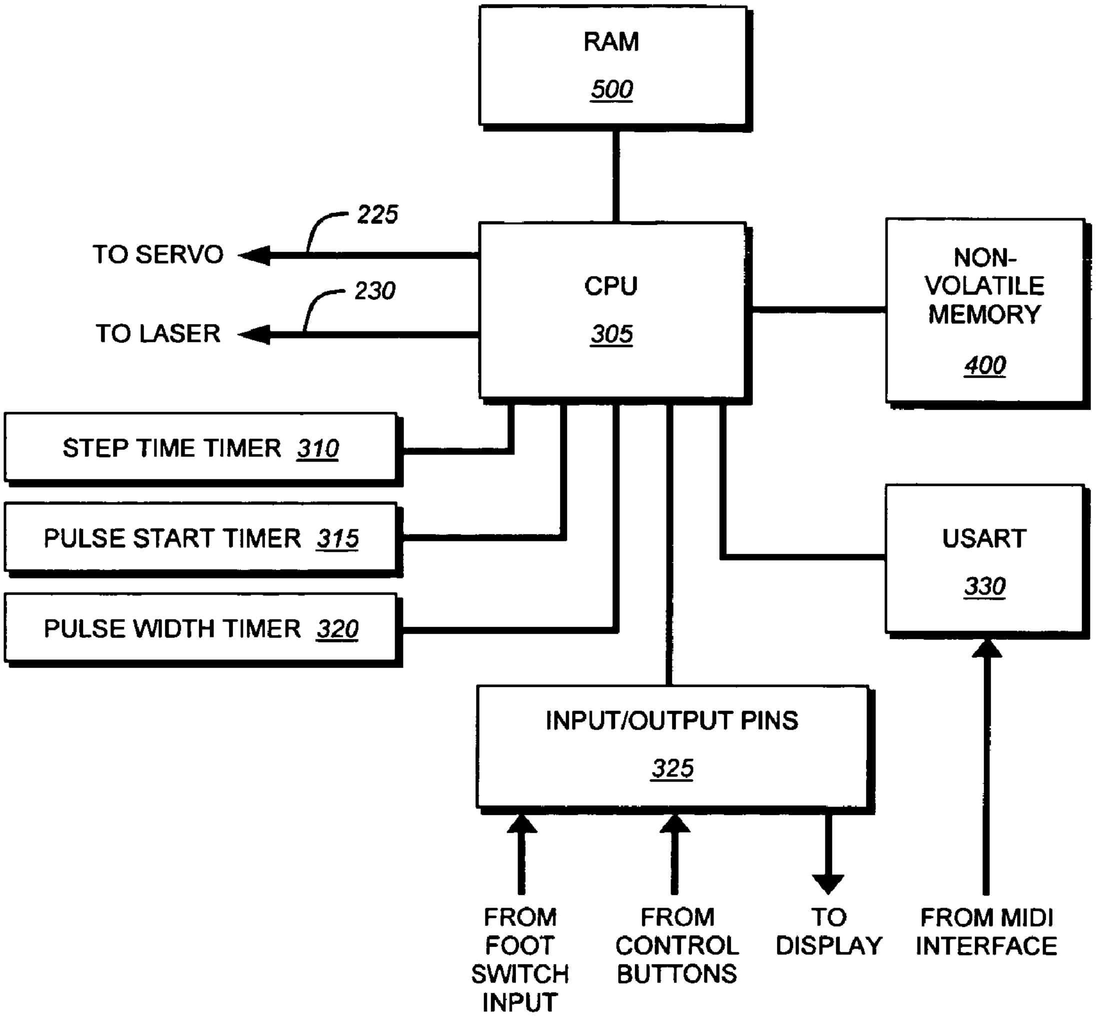
FIG. 3 is a schematic block diagram of an exemplary microcontroller of the laser metronome of FIG. 1 in accordance with the present invention.

FIG. 3 is a schematic block diagram of an exemplary microcontroller 300 in accordance with an embodiment of the present invention. A "microcontroller" 300, as described herein, is an electrical or electromechanical device which controls and/or regulates the motion of the reciprocating driver and/or the laser beam 115 according to a tempo setting. The microcontroller 300 may be divided into multiple components or, as in the illustrative embodiment, comprise an integrated component, such as a microchip. According to the illustrative embodiment, wherein the reciprocating driver is a hobby servo controlled by a 100 Hz pulse train, the microcontroller 300 is a Microcontroller Model PIC16F627A available from Microchip Technology Inc. of Chandler, Ariz. However, it is expressly contemplated that other digital and/or analog chips, circuits, or devices (e.g., an LC ring circuit) may be used as a "microcontroller" 300 in accordance with the present invention.

Illustratively, the microcontroller 300 includes a Central Processing Unit (CPU) 305, a non-volatile memory 400, a Random Access Memory (RAM) 500, a Universal Synchronous Asynchronous Receiver-Transmitter (USART) 330, a Step Time Timer 310, a Pulse Start Timer 315, a Pulse Width Timer 320, and a plurality of Input/Output (I/O) Pins 325. CPU 305 interfaces with and controls the servo 205, the laser 200, and the other components of the microcontroller 300. Illustratively, CPU 305 executes software to implement the functionality of the laser metronome 100, however, according to alternate embodiments, the functions of the CPU 305 and/or microcontroller 300 may be implemented in hardware, e.g., as an application-specific integrated circuit (ASIC) or similar state machine architecture. Non-volatile memory 400 stores software and variables required by the CPU 305 during initialization and control data necessary for generating a range of tempos, as described below in reference to FIG. 4. RAM 500 stores runtime variables, flags, counters, and other registers, as described below in reference to FIG. 5. USART 330 is configured to read data from the MIDI interface 220 at the MIDI protocol standard data rate of 31.25 Kbps asynchronously and to pass data to the CPU 305, as described below in reference to FIG. 7. The Step Time Timer 310 regulates the amount of time between the intermediate steps during each beat, as described below in reference to FIG. 8. The Pulse Start Timer 315 regulates the amount of time between pulses of the pulse train, as described below in reference to FIG. 9. The Pulse Width Timer 320 regulates the length of each pulse, as described below in reference to FIG. 10. I/O Pins 325 operatively connect the CPU 305 to the other components of the laser metronome 100, such as the display 135, the control buttons 130, and the foot switch input 215.

Figure 4:
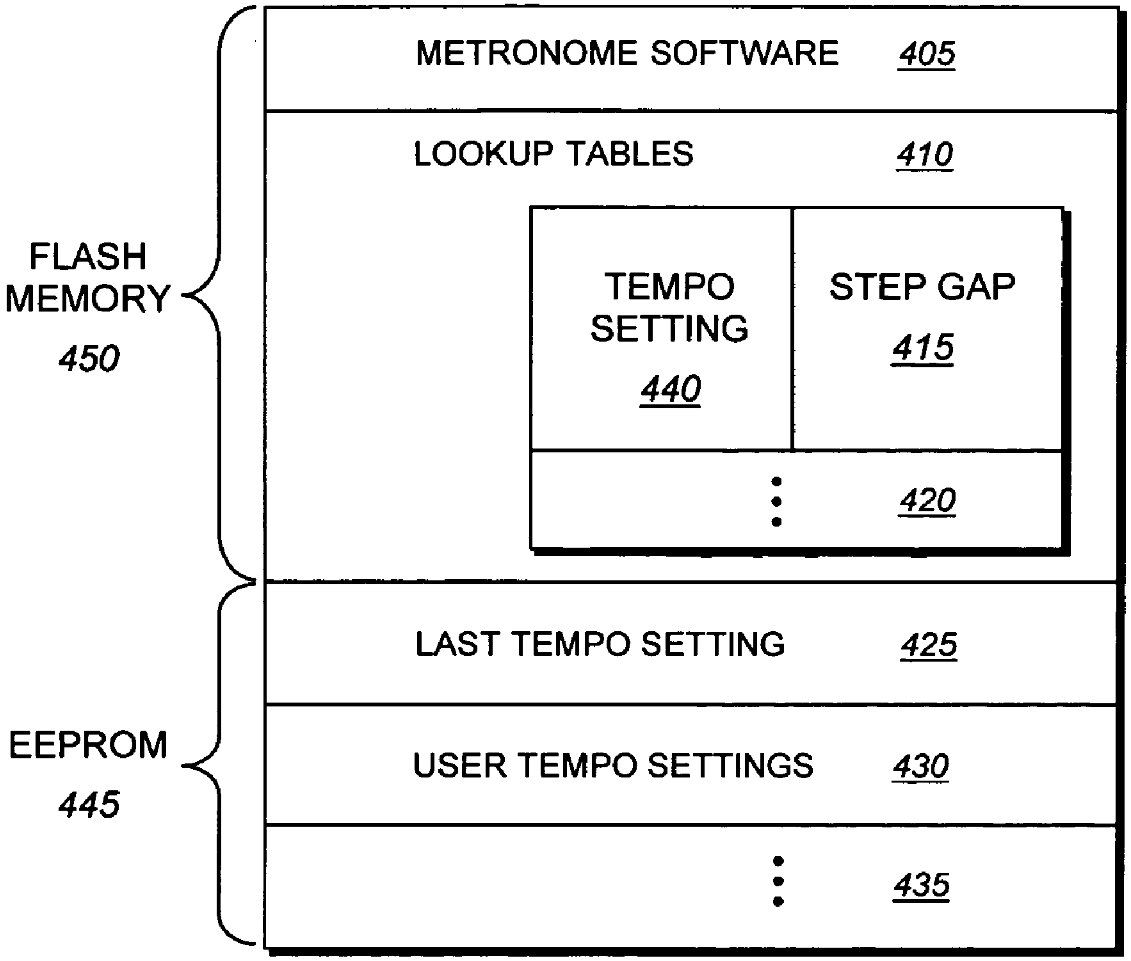
FIG. 4 is a schematic block diagram illustrating the format of a non-volatile memory of the microcontroller of FIG. 3 of the present invention.

FIG. 4 is a schematic block diagram illustrating the format of a non-volatile memory 400 in accordance with an embodiment of the present invention. Non-volatile memory 400 is a memory device capable of storing initialization and configuration information necessary to the functioning of the laser metronome 100. Illustratively, non-volatile memory 400 is a memory circuit which reliably stores information regardless of whether the laser metronome 100 is turned on. Given the illustrative embodiment, where the microcontroller 300 is a Microcontroller Model PIC16F627A, non-volatile memory 400 is divided into a flash memory 450, for storing operational software and lookup tables, and an Electrically-Erasable Programmable Read-Only Memory (EEPROM) 445, for storing user tempo settings. However, any other memory circuit, storage device, and/or data storage medium, such as a computer disk drive, may be used in place of non-volatile memory 400. According to the illustrative embodiment, data fields in non-volatile memory 400 may be written to, rewritten, and/or deleted in response to commands and/or signals from the CPU 305.

Illustratively, flash memory 450 stores metronome operating software 405 and one or more lookup tables 410 (described below). The metronome software 405 is loaded by the CPU 305 when the laser metronome 100 is turned on. The CPU 305 then executes the metronome software 405 to control the components of the microcontroller 300 and, more generally, the laser metronome 100.

The lookup tables 410 contain a plurality of step gaps 415 corresponding to tempo settings 440 and additional information 435 according to alternate embodiments. A step gap 415 is a data value representing the amount of time between each step. The amount of time between each step depends on the tempo setting of the laser metronome 100 and the number of steps during each beat. For example, according to the illustrative embodiment wherein the motion of the servo 205 and corresponding laser beam 115 is divided into 24 steps during each beat, given a tempo of 60 bpm (1 beat per second) the amount of time between each step is 41.667 ms (1 second divided by 24 steps). The lookup tables 410 store a list of tempo settings 440 and their corresponding step gaps 415. Note that the step gaps 415 may be stored according to any data format recognizable and/or usable by the CPU 305. For example, the step gaps 415 may be stored as data values representing the number of CPU processor cycles and/or instructions between steps. For example, where the CPU 305 executes instructions at a rate of 1 MHz (1 million instructions per second) and there are 24 steps per beat, the value of the step gap 415 corresponding to a tempo setting 440 of 60 bpm would be 41,667 (representing 41,667 instructions between steps). When a musician selects a tempo setting 440 for the laser metronome 100, CPU 305 reads the corresponding step gap 415 from the lookup tables 410, as described below in reference to FIG. 7. Alternately, the lookup tables 410 may contain only the step gaps 415, without corresponding tempo settings 440, and CPU 305 may be configured to reference the step gaps 415 directly. According to alternate embodiments, the additional information 420 stored in the lookup tables 410 may include other information relevant to the timing of the reciprocating driver, e.g., information required to regulate an electromechanical motor as the driver. The additional information 420 in the lookup tables 410 may also include information relevant to controlling the servo 205, e.g., a list of servo positions and widths of pulses of the pulse train, the pulse widths corresponding to the servo positions.

According to the illustrative embodiment, EEPROM 445 stores a last tempo setting 425, one or more user tempo settings 430, and additional information 435 according to alternate embodiments. The last tempo setting 425 corresponds to the most recently used user tempo setting 430 and is loaded by the CPU 305 when the laser metronome 100 is turned on, as described below in reference to FIG. 6. The user tempo settings 430 are an adjustable list of tempo settings 440 preferred by the musician using the laser metronome 100. Illustratively, the metronome software 405 executing on the CPU 305 is configured to respond to signals from the control buttons 130 to access and/or modify the user tempo settings 430. For example, pressing the Mode Function button may toggle between two modes: a first mode for adjusting the current tempo setting 560 incrementally, and a second mode for selecting a tempo setting 440 from the user tempo settings 430. In the first mode, pressing the Next Function button increments the current tempo setting 560 by 1 bpm, and holding down the Next Function button for more than 3 seconds continuously increments the current tempo setting 560 at a fast rate. In the second mode, pressing the Next Function button selects a next user tempo setting 430 as the current tempo setting 560. Pressing the Mode Function button twice in a row may save the current tempo setting 560 as a user tempo setting 430. Illustratively, the last tempo setting 425 and user tempo settings 430 may be pointers pointing to the memory locations of the corresponding tempo settings 440 in the lookup tables 410.

The non-volatile memory 400 may store additional information 435 according to alternate embodiments; for example, a musician may store one or more custom routines and/or sequences of tempo settings to be triggered by a signal from, e.g., the foot switch input 215. The illustrative embodiment provides an example technique for adjusting the tempo of the laser metronome 100, however the present invention is not limited to this technique. As such, the described control buttons 130 and tempo setting data stored in the EEPROM 445 should be taken as illustrative only. Likewise, dividing the non-volatile memory 400 into a flash memory 450 and EEPROM 445 should also be taken as illustrative only.

Figure 5:
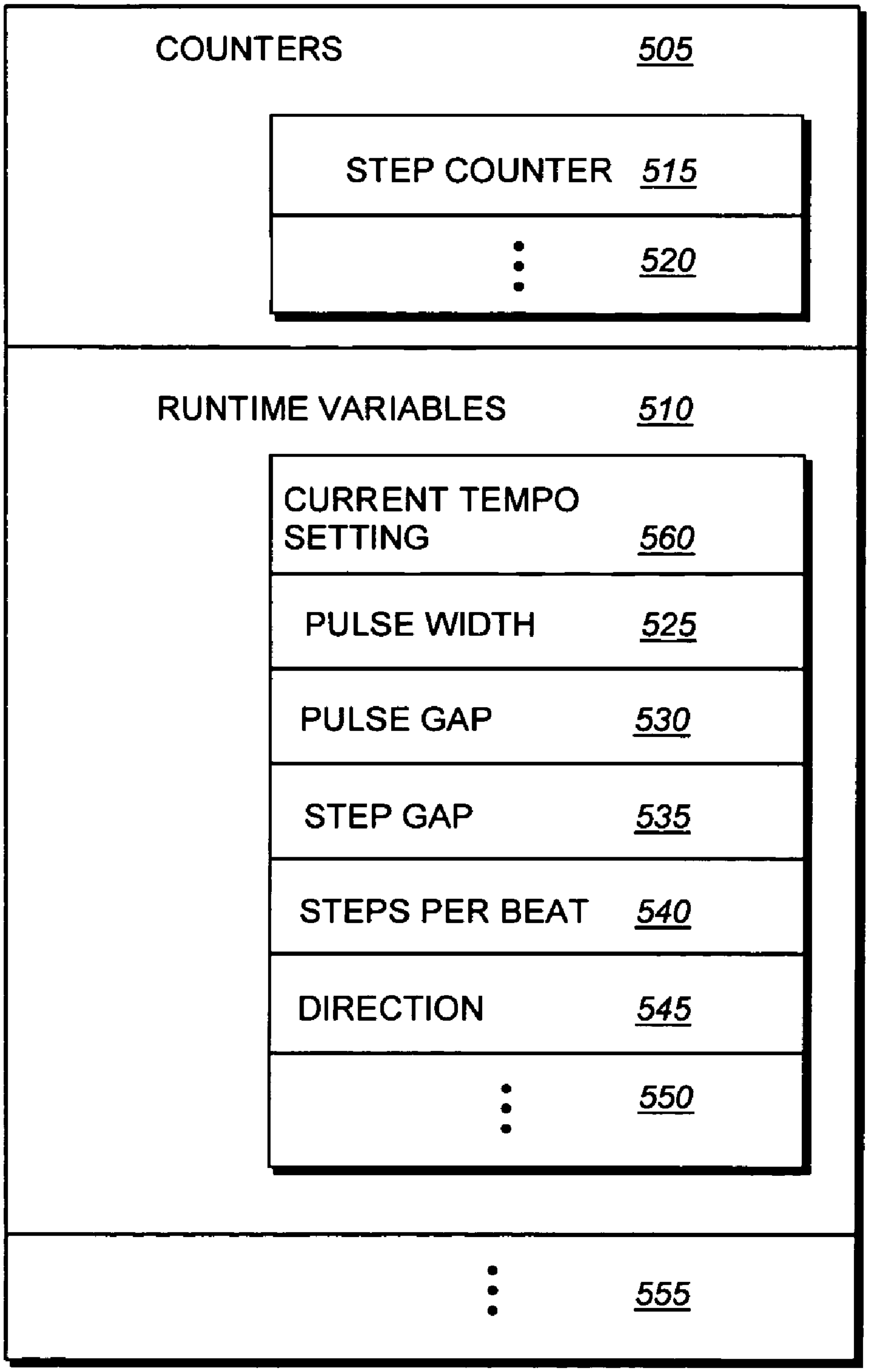
FIG. 5 is a schematic block diagram illustrating the format of a Random Access Memory (RAM) of the microcontroller of FIG. 3 in accordance the present invention.

FIG. 5 is a schematic block diagram illustrating the format of a Random Access Memory (RAM) 500 in accordance with an embodiment of the present invention. RAM 500 is a memory device capable of storing information necessary to the functioning of the laser metronome 100. Illustratively, RAM 500 is a memory circuit which reliably stores information while the laser metronome 100 is turned on. However, any other memory, storage device, and/or data storage medium, such as a computer disk drive or flash memory, may be used in place of RAM 500. Data fields in RAM 500 may be written to, rewritten, and/or deleted in response to commands and/or signals from the CPU 305.

Illustratively, RAM 500 stores one or more counters 505, a plurality of runtime variables 510, and additional information 555 according to alternate embodiments. The counters 505 include a step counter 515 and additional counters 520 according to alternate embodiments. The runtime variables 510 include a current tempo setting 560, a pulse width 525, a pulse gap 530, a current step gap 535, a number of steps per beat 540, a direction 545, and additional variables 550 according to alternate embodiments.

The counters 505 are data values incremented and/or decremented by CPU 305 to track changing aspects of the laser metronome 100 and/or data received by the laser metronome 100. Illustratively, the step counter 515 tracks the intermediate steps of the servo 205 and the corresponding laser beam 115. According to the illustrative embodiment, where there are 24 steps during each beat, the step counter 515 counts from 0 to 24, incrementing by 1 in response to each step. More generally, the step counter 515 counts from 0 to the number of steps per beat 540, which is stored as a runtime variable 510. In response to the step counter 515 reaching the number of steps per beat 540, the microcontroller 300 reverses the direction of motion of the servo 205 and the corresponding laser beam 115 and resets the step counter 515, as described below in reference to FIG. 8. Thus, the step counter 515 reaching the number of steps per beat 540 corresponds to the laser beam 115 reaching a beam path boundary 140. According to alternate embodiments, where the driver is a continuously variable analog motor, the step counter 515 may represent the location of the driver for the purpose of regulating the motor. Alternately, a step counter 515 may be unnecessary. The additional counters 520 may be used in alternate embodiments to track other information. For example, a beat counter may be incremented in response to each beat for the purpose of tracking and emphasizing a downbeat.

The runtime variables 510 are data values generated, stored, and/or accessed by the CPU 305 during runtime operation of the laser metronome 100. The current tempo setting 560 represents the current tempo which the laser metronome 100 is set to. Illustratively, the current tempo setting 560 is a pointer pointing to the memory location in the flash memory 450 of a tempo setting 440, however it may alternately be a pointer pointing to the corresponding step gap 415, depending on the implementation of the flash memory 450. Illustratively, the pulse width 525 represents the duration of the pulses of the pulse train to the servo 205. Thus, for each step of the servo 205 during each beat, the pulse width 525 corresponding to the current servo position is either recomputed by the CPU 305 or retrieved from a lookup table 410. The pulse gap 530 represents the amount of time between pulses of the pulse train to the servo 205. According to the illustrative embodiment, where the servo 205 is a hobby servo controlled by a 100 Hz pulse train, the pulse gap 530 is 10 ms, and the pulse width 525 may be between 1 ms and 2 ms. The current step gap 535 represents the amount of time between each step of the servo 205 at the current tempo setting 560. As discussed above, in reference to step gaps 415, variables representing amounts of time may be stored according to any data format recognizable and/or usable by the CPU 305. For example, the pulse gap 530 may be stored as a data value representing the number of CPU processor cycles and/or instructions between pulses. For example, where the CPU 305 executes instructions at a rate of 1 MHz (1 million instructions per second) and the amount of time between pulses is 10 ms, the value of the pulse gap 530 may be 10,000.

The number of steps per beat 540 represents the number of intermediate steps of the servo 205 and corresponding laser beam 115 during each beat. Illustratively, the number of steps per beat 540 is 24, however, according to alternate embodiments, this number may be different, adjustable, and/or variable. Direction 545 represents the current direction of motion of the servo 205 and corresponding laser beam 115. Illustratively, where the beam path 110 is linear with only two beam path boundaries 140, direction 545 is a single bit. A value of 0 indicates the laser beam 115 is sweeping in one direction; a value of 1 indicates the laser beam 115 is sweeping in the opposite direction. According to alternate embodiments, such as where the beam path 110 is nonlinear with more than two beam path boundaries 140, direction 545 may be a more complex variable indicating, e.g., a current segment of the path 110.

According to alternate embodiments, additional runtime variables 550 and additional information 555 may be stored in RAM 500. For example, where the laser 200 is fixed inside the enclosure and the beam path 110 is controlled by one or more mirrors, additional runtime variables 550 may be used to regulate one or more drivers controlling the mirrors. The drivers controlling the mirrors may be servos requiring counters and variables similar to the embodiment described above. Alternately, other variables, counters, and information may be stored in RAM 500 to control and/or regulate the drivers. Likewise, depending on the embodiment, aspects of the functionality of non-volatile memory 400 and RAM 500 may be combined, for example where the functionality of both components is provided by a rewritable computer readable medium, such as a disk drive. Furthermore, RAM 500 may use the same hardware architecture as non-volatile memory 400 (i.e., RAM 500 is not necessarily a volatile memory circuit); these two memory components are separately described herein for illustrative purposes only.

Figure 6:
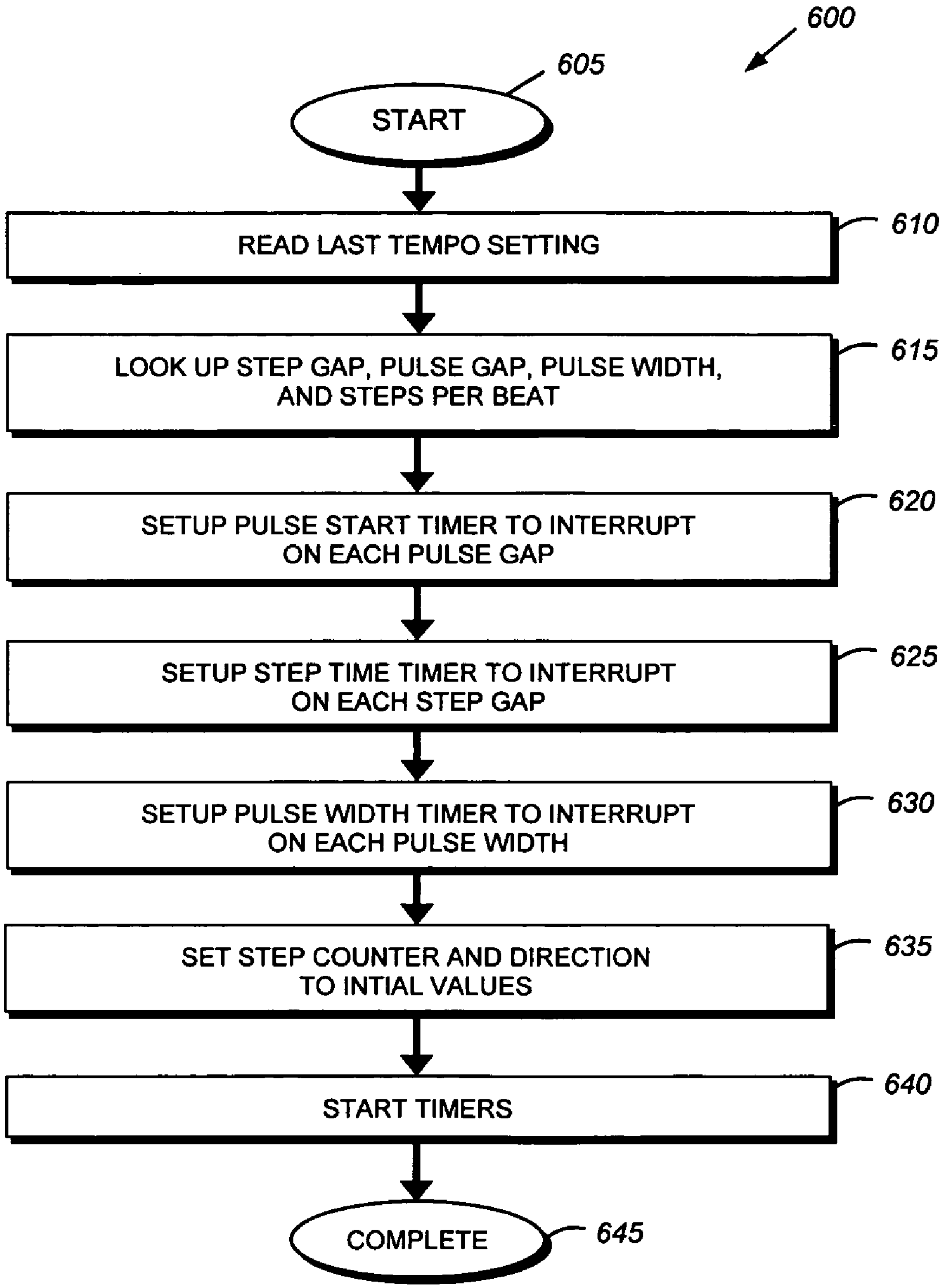
FIG. 6 is a flowchart detailing the steps of a procedure for initializing the laser metronome of FIG. 1 in accordance with the present invention.

FIG. 6 is a flowchart detailing the steps of a procedure 600 for initializing a laser metronome 100 in accordance with an illustrative embodiment of the present invention. When the laser metronome 100 is turned on, the CPU 305 loads the metronome operating software 405 and executes an initialization procedure 600 to set the laser metronome 100 to the last tempo setting 425, a last user tempo setting 430, or a default tempo setting. The procedure 600 begins at step 605 and continues to step 610 where the CPU 305 reads the last tempo setting 425 from EEPROM 445 and stores this value as the current tempo setting 560 in RAM 500. At step 615, the CPU 305 looks up the step gap 415 corresponding to the current tempo setting 560 in the lookup tables 410 and stores this value as the current step gap 535. The CPU 305 also looks up and/or generates initial values for the pulse width 525, the pulse gap 530, and the steps per beat 540, values which may depend on the embodiment and the type of driver or servo. At step 620, the CPU 305 initializes and configures the Pulse Start Timer 315 to generate an interrupt message upon reaching the amount of time represented by the pulse gap 530. At step 625, the CPU 305 initializes and configures the Step Time Timer 310 to generate an interrupt message upon reaching the amount of time represented by the step gap 535. At step 630, the CPU 305 initializes and configures the Pulse Width Timer 320 to generate an interrupt message upon reaching the amount of time represented by the pulse width 525. At step 635, the CPU 305 sets the step counter 515 and the direction 545 to initial values corresponding to an initial or a default position of the servo 205 and the corresponding laser beam 115. The value of the step counter 515 and the pulse width 525 may be related, and the CPU 305 may generate the initial pulse width 525 based on the initial value of the step counter 515 or vice versa. For example, after being turned on, the laser metronome 100 may default to the beginning of a beat, thereby corresponding to a step counter 515 value of 0 and a direction value 545 of 0. Illustratively, where the angular limits of the projected laser beam 115 correspond to pulse widths of 1.25 ms and 1.75 ms, the initial step counter 515 value of 0 corresponds to an initial pulse width 525 of 1.25 ms (or a value representing 1.25 ms). Once the timers 310, 315, 320, the counters 505, and the runtime variables 510 are initialized, the procedure continues to step 640, where the CPU starts the timers 310, 315, 320 and operation of the laser metronome 100 begins. The initialization procedure 600 is complete at step 645.

Figure 7:
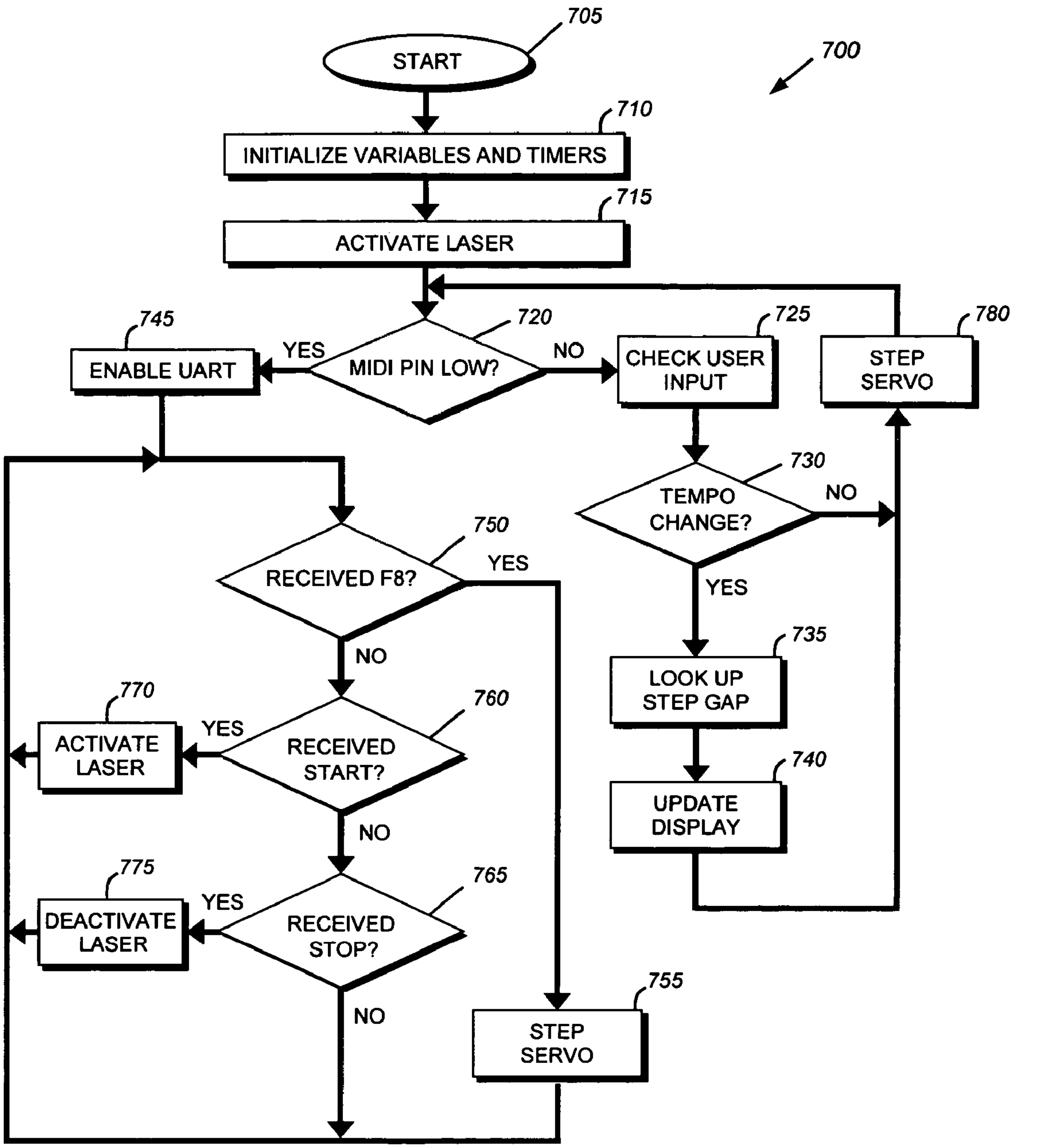
FIG. 7 is a flowchart detailing the steps of a procedure for controlling the tempo of the laser metronome of FIG. 1 in accordance the present invention.

FIG. 7 is a flowchart detailing the steps of a procedure 700 for controlling the tempo of the laser metronome 100 in accordance with an embodiment of the present invention. The procedure begins at step 705, proceeds to step 710, and executes continuously during operation of the laser metronome 100. At step 710, the CPU 305 initializes the runtime variables 510, the counters 505, and the timers 310, 315, 320, according to the initialization procedure 600 described above. Next, at step 715, the CPU 305 activates the laser 200. At step 720, the CPU 305 checks the MIDI interface 220 to determine whether the laser metronome 100 is under MIDI control. When not under MIDI control, as in step 725, the laser metronome 100 defaults to normal operation where the microcontroller 300 signals the servo 205 to reciprocate at the current tempo setting 560. At step 725, the CPU 305 checks the I/O pins 325 for a signal from the control buttons 130. At step 730, if the control buttons 130 do not indicate a tempo change, the procedure 700 continues to step 780, where CPU 305 checks for a Step Time Timer 310 interrupt and steps the servo 205 if indicated, as described in the stepping procedure 800, as described below in reference to FIG. 8. The procedure 700 continues from step 780 back to step 720, and the microcontroller 300 continues to signal the servo 205 to reciprocate at the current tempo setting 560. Alternately, if the control buttons 130 indicate a tempo change, step 730 proceeds to step 735 where the CPU 305 sets the new current tempo setting 560 according to the signal from the control buttons 130 and sets the current step gap 535 to the step gap 415 corresponding to the new current tempo setting 560. At step 740, CPU 305 signals the display 135 to indicate the new current tempo setting 560, and the procedure 700 then continues to step 780, where CPU 305 checks for a Step Time Timer 310 interrupt according to the stepping procedure 800.

When the laser metronome 100 is operating under MIDI control, step 720 proceeds to step 745 where there CPU 305 enables USART 330 to receive messages from the MIDI interface 220. According to the MIDI protocol, each beat is divided into 24 hexadecimal "F8" characters in a sequence of MIDI messages. Note that use of the "F8" character is exemplary, and other characters, messages, and/or signals may be employed to indicate steps and/or beats. Thus, according to the illustrative embodiment, each beat is divided into 24 steps, each step corresponding to a received "F8" character when the laser metronome is operating under MIDI control. At step 750, the CPU 305 checks the received MIDI message for an "F8" character. When the USART 330 receives an "F8" character, the procedure 700 continues to step 755 where the CPU 305 steps the servo 205, the procedure 800 for which is described below in reference to FIG. 8. After stepping the servo 205 in response to an "F8" character, the procedure 700 returns to step 750.

The laser metronome 100 may also respond to other MIDI messages, such as "start" or "stop" signals. The MIDI protocol defines a "start" signal as a hexadecimal "FA" character and a "stop" signal as a hexadecimal "FC" character, however other signals, characters, and/or messages may be employed as "start" or "stop" signals. When the USART 330 is not receiving an "F8" character, procedure 700 continues from step 750 to step 760 to check for other recognized MIDI messages. At step 760, the CPU 305 checks for a "start" signal, which may be any sequence of MIDI characters predetermined to represent an instruction to start the laser metronome 100. In response to a "start" signal, CPU 305 activates the laser 200 at step 770, and the procedure 700 returns to step 750. Alternately, at step 765, the CPU 305 checks for a "stop" signal, which may be any sequence of MIDI characters predetermined to represent an instruction to stop the laser metronome 100. In response to a "stop" signal, CPU 305 deactivates the laser 200 at step 775, and the procedure returns to step 750. According to alternate embodiments, the laser metronome 100 may respond to other MIDI messages, such as MIDI information representing a percussion track, to enable alternate features, such as a downbeat indicator. Where the received MIDI message is not a recognized message representing an instruction to the laser metronome 100, the procedure 700 returns to step 750.

Figure 8:
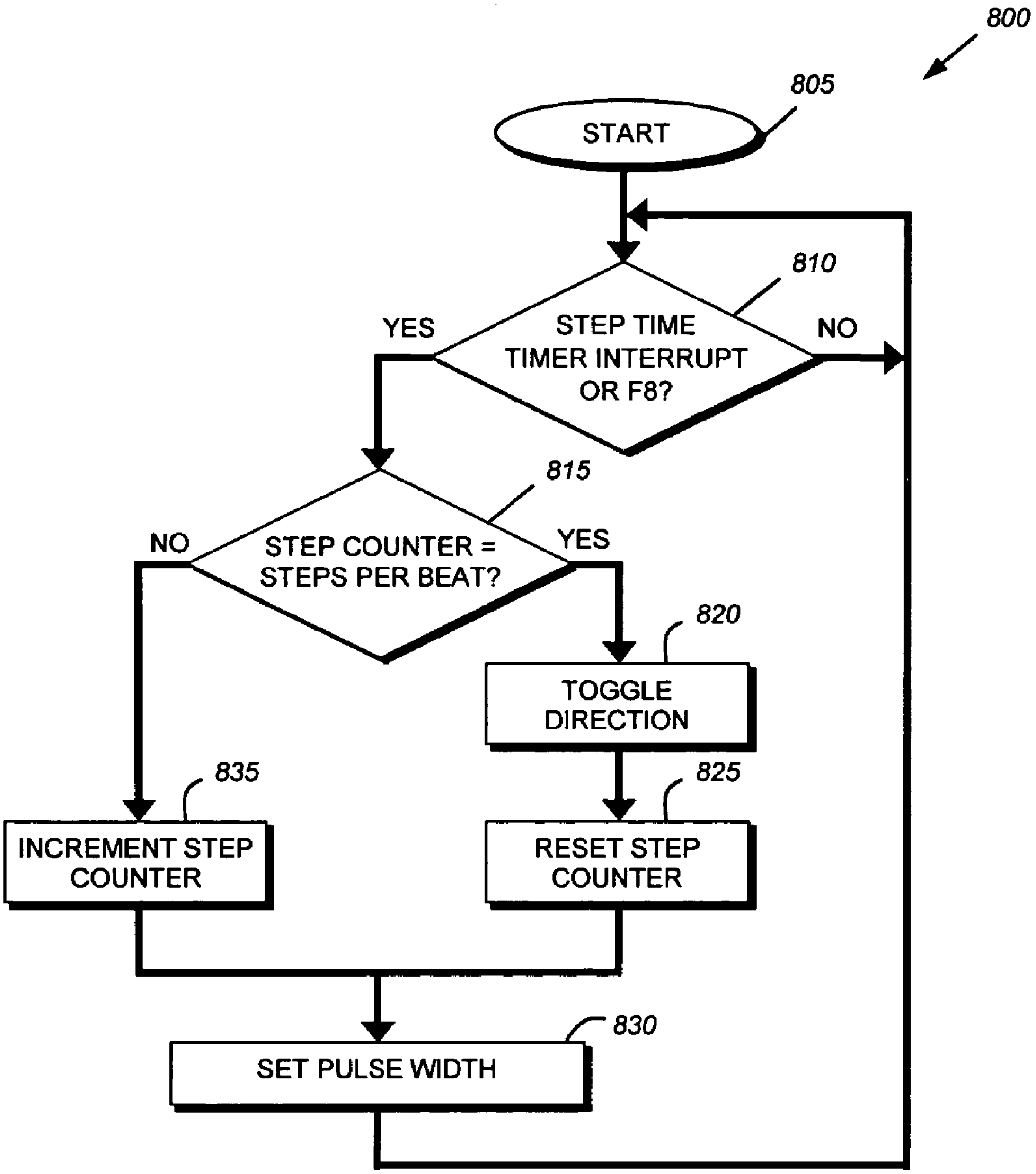
FIG. 8 is a flowchart detailing the steps of a procedure for stepping the servo of FIG. 2 between beats in accordance the present invention.

FIG. 8 is a flowchart detailing the steps of a procedure 800 for stepping the servo 205 between beats in accordance the present invention. According to the illustrative embodiment, a step occurs in response to an interrupt by the Step Time Timer 310 or an "F8" character received through the MIDI interface 220, as shown in step 810. In response to the interrupt or "F8" character, the CPU 305 checks the step counter 515 in step is 815. If the step counter 515 contains a value less than the number of steps per beat 540, CPU 305 increments the step counter 515 at step 835. Conversely, if the step counter 515 contains a value equal to the number of steps per beat 540, this indicates that the laser beam 115 has reached a first of two beam path boundaries 140 and the servo 205 must reverse its direction of motion. Thus, at step 820, CPU 305 toggles the direction 545. At step 825, the step counter 515 is reset. Alternately, the step counter 515 may be decremented during each step in the opposite direction, rather than reset, thereby returning the step counter 515 to zero when the laser beam 115 reaches the second beam path boundary 140. Where the step counter 515 is configured to decrement, rather than reset, CPU 305, at step 815, is additionally configured to check whether the step counter 515 equals zero. Regardless of whether the laser beam 115 has reached a beam path boundary 140, the procedure 800 continues to step 830 where CPU 305 sets the pulse width 525 to a value corresponding to the new position of the servo 205 and corresponding laser beam 115. The new pulse width 525 may be computed by CPU 305 or retrieved from a lookup table 410. The procedure 800 then returns to step 810 and executes continuously during operation of the laser metronome 100.

Figure 9:
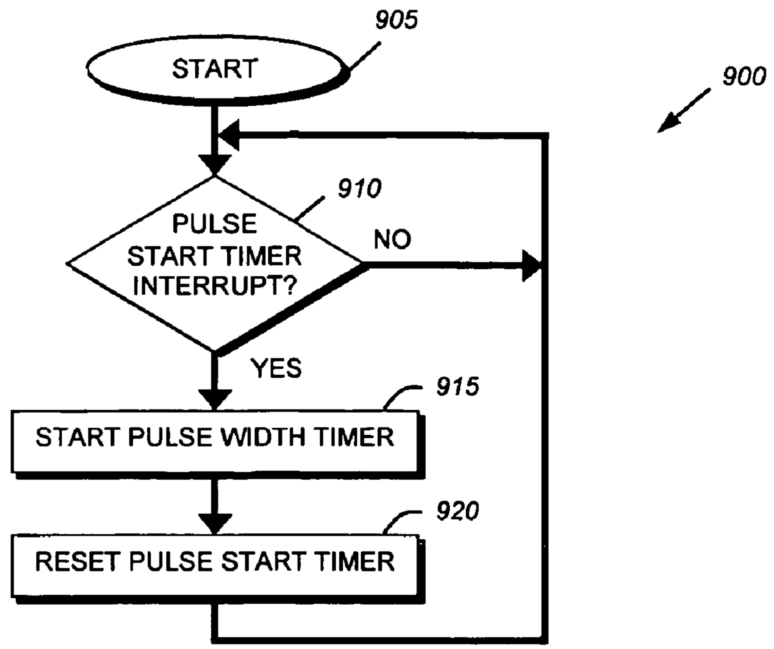
FIG. 9 is a flowchart detailing the steps of a procedure for timing a series of pulses to the servo of FIG. 2 in accordance with the present invention.

FIG. 9 is a flowchart detailing the steps of a procedure 900 for timing a series of pulses to the servo 205 in accordance with the present invention. Illustratively, the servo 205 is a RC hobby servo 205 controlled by a 100 Hz pulse train (i.e., 1 pulse per 10 ms); thus, the Pulse Start Timer 315 is configured, during the initialization procedure 600, to generate an interrupt message after 10 ms. The procedure 900 begins at step 905, continues to step 910, and executes continuously during operation of the laser metronome 100. At step 910, CPU 305 checks for an interrupt message from the Pulse Start Timer 315. In response to an interrupt message, CPU 305 starts the Pulse Width Timer 320 at step 915. CPU 305 also initiates procedure 1000, described below in reference to FIG. 10, to initiate and control a pulse to the servo 205. Next, at step 920, CPU 305 resets the Pulse Start Timer 315 (typically by setting the timer 315 to zero), so the timer 315 will generate another interrupt message in 10 ms. The procedure 900 then returns to step 910 to await the next interrupt from the Pulse Start Timer 315.

Figure 10:
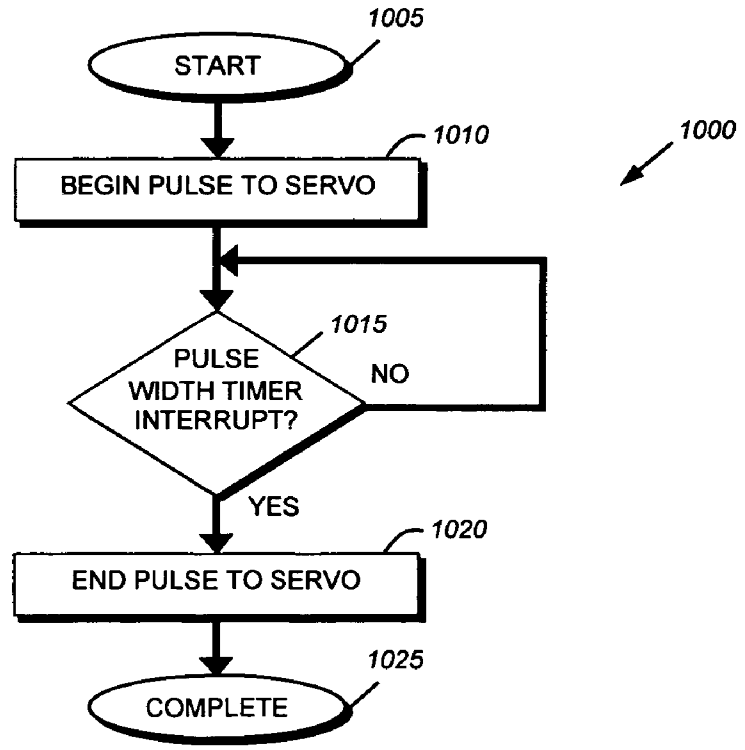
FIG. 10 is a flowchart detailing the steps of a procedure for timing the width of a pulse to the servo of FIG. 2 in accordance with the present invention.

FIG. 10 is a flowchart detailing the steps of a procedure 1000 for timing the width of a pulse to the servo 205 in accordance with the present invention. The procedure 1000 begins at step 1005 in response to an interrupt message from the Pulse Start Timer 315 as described above in reference to FIG. 9. At step 1010, CPU 305 begins a pulse to the servo

205. Illustratively, the servo 205 is a RC hobby servo 205 controlled by a 100 Hz pulse train with pulse widths between 1 ms and 2 ms; thus, the Pulse Width Timer 320 is configured, during the initialization procedure 600 or the stepping procedure 800, to generate an interrupt message after an amount of time between 1 ms and 2 ms, depending on the current desired position of the servo 205 and corresponding laser beam 115. At step 1015, CPU 305 checks for an interrupt message from the Pulse Width Timer 320. In response to an interrupt message from the timer 320, CPU 305 ends the pulse to the servo 205 at step 1020, and the procedure 1000 ends at step 1025.

The above-described procedures 600, 700, 800, 900, 1000 (FIGS. 6-10) describe the operation of an illustrative embodiment of the laser metronome 100 as described in reference to FIG. 2, where the driver is a RC hobby servo 205 controlled by a microcontroller 300. However, the procedures for controlling the laser beam 115 may vary according to alternate embodiments. Likewise, the above-described procedures 600, 700, 800, 900, 1000 may vary even where the driver is a RC hobby servo 205 controlled by a microcontroller 300. Such variations and modifications as would be obvious to those skilled in the art are included within the scope of the present invention. Thus, the above-described procedures 600, 700, 800, 900, 1000 should be taken as exemplary only.

Figure 11:
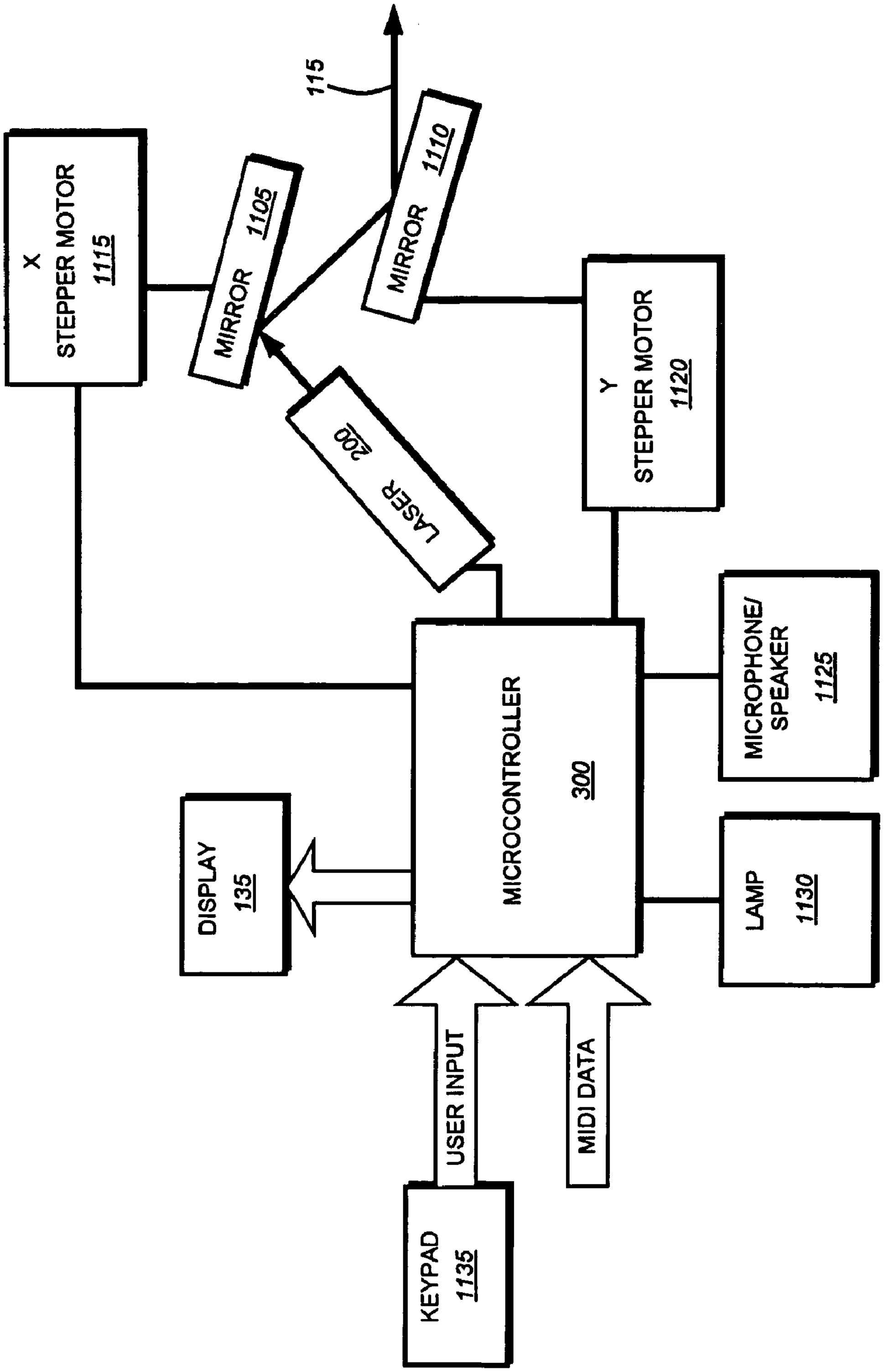
FIG. 11 is a schematic block diagram of a laser metronome in accordance with one or more alternate embodiments of the present invention.

FIG. 11 is a schematic block diagram of a laser metronome 100 in accordance with a further embodiment of the present invention, where the laser 200 remains in a fixed position in the enclosure, and the laser beam 115 is directed at one or more moving mirrors 1105, 1110 attached to one or more galvanometers, servos, stepper motors 1115, 1120, or other electro-optic modulators controlled by the microcontroller 300 and/or one or more reciprocating drivers. According to this embodiment, the predetermined pattern (i.e., the beam path 110) is two-dimensional, and an additional visual indication of a downbeat or other aspects of the musical score may be visually projected. For example, X StepperMotor 1115 may tilt a first mirror 1105 to reflect the laser beam 115 to different positions along a horizontal axis of the two-dimensional beam path 110, and Y StepperMotor 1120 may tilt a second mirror 1110 to reflect the laser beam 115 to different positions along a vertical axis of the two-dimensional beam path 110. Furthermore, the motion of the mirrors 1105, 1110 may be customized and/or programmed to project multiple possible patterns in response to inputs, controls, and/or music data, such as a MIDI signal.

The laser metronome 100 of FIG. 11 also includes some alternate features not included in the illustrative embodiment of FIG. 2, any or all of which can be selectively provided to any embodiment contemplated herein. A microphone/speaker 1125 provides an auditory queue, such as a clicking sound, as an additional indication of the current tempo setting. Alternately, the auditory queue may be sent to one or more musicians from one or more microphone jacks. The microphone/speaker 1125 may also function as a tap sensor, such that a musician may set the current tempo setting of the laser metronome 100 by making a tapping sound at a recognizable tempo, e.g., by tapping a drumstick against a surface. Tap sensors and microcontroller logic for recognizing tempo from a tapping sound are understood by those skilled in the art of electronic metronomes. In general, an audible tap is recognized and averaged into a given tempo using known techniques. As an alternative to using the microphone/speaker 1125 as the tap sensor, a button, switch, foot switch, and/or other input devices may be utilized as the tap sensor. The laser metronome 100 of FIG. 11 also includes a keypad 1135 as an input 125 and a flashing lamp 1130 as an additional element of the display 135. These and other alternate features are expressly contemplated as within the scope of the present invention.

According to further alternate embodiments, the laser metronome may have additional functionality or features, such as a computer data connection, a digital display, a programmable tempo memory, a downbeat queue, additional visual queues, more complex beam paths, an auditory queue, a tap sensor, and/or features to enhance the laser metronome's portability (e.g., remote controls and wireless features). For example, typically for shorter range operations, the virtual or actual pivot can be replaced with (or supplemented by) a shuttle system that moves the beam in substantially lateral (e.g., side-to-side) rather than pivotal motion. The term "driver" should be taken to include such lateral movement capability. The laser metronome 100 may even include a plurality of drivers and/or lasers which may be selectively enabled to provide a plurality of patterns and/or visual queues. Likewise, the sweep angle of the beam may be variable and/or adjustable. It will be apparent that other variations and modifications may be made to the described embodiments, with the attainment of some or all of their advantages.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented using any technique for controlling a beam of substantially collimated light. Similarly, while a point of light may be the projected visual queue in an illustrative embodiment, a variety of more complex shapes and even varying shapes that follow a predetermined pattern on a surface can be used. Such shapes can include text, pictures, or abstract visuals. Additionally, the procedures, processes, and/or components described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for indicating a progress of a tempo, the method comprising the steps of:

projecting a laser beam from a laser as a visual queue causing the laser beam to move in a predetermined pattern tracing a path between at least two beam path boundaries across one or more surfaces, the motion of the laser beam controlled by a rotating mechanical driver upon which the laser is mounted and whose rotational motion drives a side-to-side sweep corresponding to the progress of the tempo; and varying the rotational motion to vary the tempo.

2. The method of claim 1 wherein the driver is a unidirectional motor operatively connected to a clevis holding the laser by a tie-bar such that the rotation of the motor causes the clevis to move in a reciprocating manner.

3. The method of claim 1 wherein the laser is mounted to the rotating mechanical driver that comprises a servo controlled by a microcontroller.

4. The method of claim 3 further comprising:

sending a plurality of pulses to the servo as a pulse train, each pulse having one of a plurality of pulse widths, each pulse width corresponding to a position of the servo.

5. The method of claim 1 wherein the predetermined pattern is divided into a plurality of intermediate steps, each step corresponding to a predetermined MIDI message.

6. The method of claim 1 further comprising:
reflecting the laser beam by one or more mirrors; and
tilting the mirrors to cause the laser beam to move in the predetermined pattern.

7. A system for indicating a progress of a tempo, the system comprising:
a laser projecting a laser beam to a surface; and
a rotating mechanical driver upon which the laser is mounted and whose rotational motion drives the laser beam to move in a predetermined pattern in a side-to-side sweep, constructed and arranged to trace a path between at least two beam path boundaries across the surface, the motion of the laser beam corresponding to the progress of the tempo.

8. The system of claim 7 further comprising:
a microcontroller controlling the rotating mechanical driver; and
one or more control buttons operatively connected to the microcontroller for adjusting the tempo, wherein the tempo is one of a range of typical musical tempos.

9. The system of claim 8 further comprising:
a memory storing a plurality of user tempo settings, wherein the tempo is selected from the plurality of user tempo settings by the control buttons.

10. The system of claim 9 further comprising:
a Mode Function button as a control button, wherein pressing the Mode Function button toggles between a plurality of modes; and
a Next Function button as a control button, wherein pressing the Next Function button in a first mode increments the tempo by 1 beat per minute and pressing the Next Function button in a second mode selects a user tempo setting as the tempo.

11. The system of claim 8 further comprising:
a display operatively connected to the microcontroller for indicating the tempo.

12. The system of claim 8 further comprising:
a MIDI interface operatively connected to the microcontroller, wherein the microcontroller is configured to adjust the motion of the laser beam in response to one or more predetermined MIDI messages received by the MIDI interface.

13. The system of claim 12 further comprising:
a plurality of intermediate steps as the predetermined pattern, each step corresponding to a hexadecimal "F8" character received by the MIDI interface.

14. The system of claim 8 further comprising:
a foot switch input operatively connected to the microcontroller, wherein the microcontroller is configured to adjust the motion of the laser beam in response to one or more predetermined signals received by the foot switch input.

15. The system of claim 8 further comprising:
a tap sensor operatively connected to the microcontroller, wherein the microcontroller is configured to adjust the motion of the laser beam in response to one or more predetermined signals received by the tap sensor.

16. The system of claim 7 further comprising:
a servo as the rotating mechanical driver, wherein the servo is controlled by sending a plurality of pulses to the servo as a pulse train, each pulse having one of a plurality of pulse widths, each pulse width corresponding to one of a plurality of positions of the servo.

17. The system of claim 16 further comprising:
a hobby servo as the servo;
a 100 Hz pulse train as the pulse train; and
a range of pulse widths between 1 ms and 2 ms as the plurality of pulse widths.

18. The system of claim 7 further comprising:
one or more mirrors, wherein the laser beam is reflected by the mirrors, causing the laser beam to move in the predetermined pattern.

19. The system of claim 7 further comprising:
a two-dimensional pattern as the predetermined pattern.

20. The system of claim 19 wherein each downbeat is emphasized by a variation in the motion of the laser beam.

* * * * *